Patented Aug. 2, 1932

1,869,697

UNITED STATES PATENT OFFICE

LESTER KIRSCHBRAUN, OF LEONIA, NEW JERSEY, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS OF MAKING BITUMINOUS EMULSIONS AND PRODUCTS THEREOF

No Drawing.   Application filed January 2, 1928.   Serial No. 244,058.

The present invention relates to a process of making emulsions, and more particularly has reference to the manufacture of aqueous dispersions of normally solid or semi-solid bitumens, such as asphalt and the like, and to improved methods for producing such dispersions.

This application is a continuation in part of co-pending applications filed by me, Serial No. 107,699, filed May 8, 1926, and Serial No. 156,965, filed December 24, 1926, (each of which constitutes a division of my previously filed application, Serial No. 339,690, which eventuated into Patent No. 1,615,303, January 25, 1927).

It is an object of the present invention to produce a dispersion of that type in which the dispersed particles are retained in suspension to the best possible extent.

An essential feature of this process resides in the conversion of asphalt or other bituminous or hydro-carbon material, which is normally of an adhesive nature into a finely divided nonadhesive form. This transformation is accomplished by a process of dispersion of the asphalt into water by means of an emulsifying agent. The asphalt used is solid or semi-solid at ordinary temperature and is of a character similar to that which is employed for the purpose of waterproofing felts, fabrics and the like as in the manufacture of prepared roofings. The asphalt may either be a native asphalt, pure or containing mineral matter softened, if desired, by means of fluxing oils, or may be the product of distillation or oxidation of asphaltic petroleums in a well known manner. It is the nature of such asphalts that when they are placed in contact at moderate temperatures they coalesce or adhere so as to form a coherent and homogeneous mass, and this is an essential characteristic of such asphalts as are used in the manufacture of the stock for particular purposes to be referred to hereinafter. In place of asphalts such as described, I may also employ tars and pitches of vegetable, animal or mineral origin, resins or resinous materials softened, if desired, with tempering oils so as to bring them to the proper consistency for the purpose intended, and such substances are regarded as comprehended by the term "bitumen" or "bitumen-pitch type base" as employed in my claims.

While the asphalt herein referred to is designated as being solid or semi-solid at atmospheric temperatures, nevertheless, it is well known that materials of this character are scientifically or more correctly known to be liquids of exceedingly great viscosity, so that while capable of being handled en masse, nevertheless they flow slowly at ordinary temperatures and require a containing vessel in order to confine them. Materials of this character are readily liquefiable by heat, exhibiting a gradual decrease in viscosity with the elevation of temperature. Such solid or semi-solid asphalts as require the application of heat as distinguished from liquid asphalts are most readily adapted to produce this non-adhesive emulsion.

In order to produce the emulsion above referred to, I use clay containing a large proportion of colloidal material as an emulsifying agent, but obviously other finely divided powders or colloidal materials which produce an emulsion of a non-adhesive character may be used in lieu thereof.

Among the other finely divided powders which may be used within the contemplation of the present invention, may be cited fuller's earth, mineral pigments, slate dust, ochre, sienna, metallic oxides and hydroxides, and silicates, which produce a viscous plastic mixture with water.

The emulsion may be produced in batches or by a continuous process. If prepared as a batch, I first make a thick aqueous suspension of the clay and heat it to a temperature approximating the melting point of the asphalt which is to be emulsified. The asphalt is also heated until it is quite fluid, the temperature varying with the viscosity of the asphalt and its melting point. Preferably a temperature of 300° to 400° F. is employed for the harder varieties of asphalt while for the softer varieties a lower temperature affords the desired degree of fluidity. The aqueous suspension heretofore referred to is produced in a vessel having means for rapidly agitating the contents thereof.

Its consistency is such that it is too fluid to hold its form but sufficiently viscous to flow slowly through a fair sized orifice. It is important that the consistency of this paste be regulated within more or less definite limits as the degree of dispersion obtained during the emulsifying operation depends largely upon the viscosity or the internal friction resulting in the agitation of the asphalt throughout the viscous clay suspension.

The molten asphalt is gradually added to the viscous suspension while the mass in the vessel is being subjected to rapid agitation. This is important in order to avoid inversion of phase and production of an adhesive emulsion. As the asphalt is introduced and continuously emulsified the mass thickens and it becomes necessary to add water in order to maintain the desired viscosity of the contents of the vessel. The addition of asphalt is continued, alternating with the additions of water and in such quantities as to maintain this desired consistency. If the vessel is sufficiently large water and asphalt may be added simultaneously in the desired proportions. It is advantageous in some cases to introduce the asphalt at a temperature above the boiling point of water as the expansive force of the steam generated upon contact of the asphalt with the aqueous suspension produces, by more or less foaming, an extension of surface of the pitchy material during its incorporation. The mechanism of this dispersing operation is somewhat as follows: As the asphalt strikes the thick aqueous suspension it becomes immediately subjected to the agitating arms of the mixer. These arms produce rapid extension and sub-division of the stream of pitch into very fine threads throughout the mass of clay suspension. The viscosity of the thick suspension assists in the formation of these threads and their fine degree of attenuation. At the same time the formation of bubbles induced by the steam generated, assists in the production of thin films and threads of the asphaltic material. As these threads are being rapidly formed and rapidly attenuated, a point is reached depending upon the temperature of the mass, its viscosity and rapidity of agitation, at which the threads have become so fine and their surface so great that they become rapidly broken and subdivided into filaments which in turn become subjected to further subdivision until their length is such that their surface tension causes the minute threads thus formed to assume a globular or spherical form. This dispersion is produced not only under the conditions and by the mechanical agency above referred to, but also through the presence of the colloid which in effect increases the surface tension of the more or less molten pitch undergoing dispersion or decreases that of the dispersive medium.

As a result of this operation the asphaltic material referred to becomes dispersed throughout the aqueous suspension into very minute particles. Under the microscope these particles exhibit a spherical or elliptical form depending on the temperature and conditions of dispersion. The more perfect the dispersion, the finer are the resulting particles. The size varies, ranging from particles which are probably of colloidal dimensions to those which can be seen as individual particles with the naked eye. The average size of the particles is about .01 millimeter. Some of the smaller particles exhibit distinctive Brownian movement. It should be noted that although the pitch is in liquid condition when introduced, the form of the particles or relation of phases does not change upon cooling and upon more or less hardening or solidification of the pitch in its subsequent reduction to normal temperatures. The emulsion thus formed has the peculiar characteristic of not being affected to the point of rupture by electrolytes but precipitates a positively charged colloid as ferric oxide sol. The emulsion itself is weakly electro-negative. It will be observed that in the system so produced the asphalt constitutes the disperse or internal phase, while the external or continuous phase comprises the water with the suspended clay colloid.

It is important to note that a desirable feature in the preparation of this emulsion resides in the degree of dispersion of the asphalt particles throughout the continuous phase. The fineness of dispersion is to a considerable extent regulated by the viscosity of the mass, which if it is desired to keep it fine, should be relatively thick or paste-like, during agitation and by its temperature. For example, if the clay suspension be too thin, and the necessary internal viscosity be lacking, the threads formed during the initial stages of dispersion are relatively coarse and the material thus comminuted may maintain various coarse stages of subdivision ranging from relatively coarse threads down to the finer particles. Likewise, if the temperature of either the asphalt or the suspension is too low, coarse particles are similarly formed. On the other hand should the temperature of the pitch or the partially formed material be too great, there is danger of partial or local coalescence of the previously formed material, due probably to the complete removal of water by heat from around some of the asphalt particles at the point of confluence with the incoming hot liquid asphalt. Furthermore, care should be taken to have sufficient water present at all times, as otherwise the asphalt will agglomerate producing complete inversion of the phase, the water and clay constituting the internal phase with the asphalt as the continuous medium. The degree of dispersion attained, plays, I believe, an effective part in causing the material to retain its non-adhesive character in the highest and most persistent degree. The process of dispersion, I believe, results in the formation of heavily absorbed films of water and clay colloid about the individual particles of asphalt. I believe that the finer the degree of dispersion attained and the greater the surface energy thus resulting, the more tenaciously is this protective film retained about the particles.

I have found when using asphalt of about 140° F. melting point, a desirable temperature at which to maintain the clay suspension is about 150° F. and a satisfactory temperature at which to carry the asphalt is about 325° to 350° F., the temperature of the batch being maintained during the addition of the hot asphalt by the introduction of further quantities of water at a proper heat to compensate for the temperature of the incoming asphalt.

When it is desired to hold the temperature of the batch or bulk supply above 212° F., in order to more advantageously emulsify very viscous materials, such as high melting point oxidized asphalts, the emulsifying apparatus is sealed and the entire operation is carried on at pressures above atmospheric. It is thereby possible to maintain a temperature above the boiling point of water without permitting evaporation or boiling away of any substantial quantities of water from the apparatus.

The non-adhesive character of the emulsion and its desirable degree of dispersion may be roughly ascertained by manual manipulation. A quantity of material when worked between the fingers should feel smooth, plastic, slippery and free from grit particles and should exhibit no tendency for the particles of asphalt to agglomerate among themselves when pressed or rubbed between the fingers. In fact, the emulsion thus produced should feel substantially like the thick clay suspension originally employed in its production. It should be readily washed from the hands with water and should be capable of dilution in all proportions with further quantities of water. If it should be desired to retain the asphalt particles in suspension to the best possible extent, a protective non-adhesive colloid may be added after the emulsification has been completed. For this purpose I may use any well known type of protective colloid, such as starch, gums, tapioca flour, tannic acid or the like.

Thus, I may add to the finished emulsion gum acacia in proportions ranging from 0.025% to 0.1% by weight of the emulsion, as a means for increasing suspendability of the product. Other gums, such as gum agar, may be substituted for acacia, in amounts ranging, say from ½ to 1% on the basis of weight of the emulsion.

Starch may also be used as the protective colloid for this purpose, and the quantities thereof may comprise about 3 to 8% by weight of the dispersion. Similarly, 1 to 3% of tapioca flour will suffice to produce a degree of suspendability within the range usually desired.

Another material which I have found suitable for this purpose is tannic acid, and where quantities of say ¼ to 1% of this material by weight of the emulsion are incorporated in a relatively non-suspendable emulsion, smaller quantities of water are generally necessary to give the proper consistency in the emulsion, and the tendency towards settling and packing of dispersed particles is largely, or entirely, eliminated, depending on the particle size.

The amount of asphalt which can thus be emulsified depends considerably upon the clay, apparently varying with the amount of colloidal matter in such clay; thus clays carrying the largest amount of colloidal matter being capable of carrying the larger amounts of asphalt. By using the proper quality of clay I have been able to make an emulsion containing as much as ten parts of asphalt, by weight, to one part of clay. An analysis of a typical emulsion made by the operation above indicated would show approximately 50%, by weight, of asphalt, 10%, by weight, of clay and 40%, by weight, of water.

I have heretofore described a batch process for producing this emulsion, but I have found where large quantities are required, that it is most desirable to effect its manufacture as a continuous operation. For this purpose, I have provided a mixer or an emulsifying apparatus provided with helical blades mounted upon a rapidly revolving shaft. In an initial stage of producing the emulsion this apparatus is charged with the aqueous suspension or with finished product as before described for batch operation. The agitation blades are so disposed as to cause a rapid incorporation of liquids introduced at the top of the vessel with the bulk contents of the container.

After the initial charge of suspension or emulsion has been prepared of the desired viscosity, asphalt in a heated liquid condition is fed into the mass preferably as it circulates downward. Simultaneously, there is fed a thin aqueous suspension of the emulsifying agent in regulated and predetermined proportions corresponding to the proportions desired in the final emulsified composition. For example, if an emulsion of the composition above described is desired, the aqueous suspension is made up in proportion of one part, by weight, of clay and four parts, by weight, of water. This suspension is fed to the emulsifier as previously described continuously and in predetermined quantities and simultaneously with the introduction of asphalt in like regulated quantities. By regulation of the volume of the incoming streams of asphalt and suspended emulsifying agent and by continuous withdrawal of the finished product from the system, an emulsified composition of the character above described will be produced.

In the producing of emulsion thus continuously it is important to maintain substantially similar conditions of viscosity in the circulating mass of finished and surplus emulsion always contained in the system. The retention of this quantity of surplus emulsion in the system acts as a balance wheel against minor variations of viscosity and temperature due to momentary introduction of excess of either asphalt or clay suspension. It will be evident that on account of such minor variations and the necessity for maintaining nearly constant conditions of proportions, temperature and viscosity, it is advantageous to maintain as large a bulk supply of finished emulsion in the system as is compatible with the rate of introduction of incoming ingredients and the withdrawal of the finished product from the mixer.

The product of this continuous operation is in all respects the same as that produced by batch operation previously described. As taken from the mixer, it is of viscid consistency but not so stiff as to prevent its ready egress from the orifice provided for its withdrawal. As fast as produced this emulsion is preferably thinned with water so as to facilitate its transfer by pumps to the storage tanks. These tanks or receptacles in which the emulsion is stored are preferably provided with mechanical agitators which serve the purpose of maintaining a uniform suspension of the asphalt throughout the aqueous medium.

I claim as my invention:

1. The process of making bituminous emulsions consisting in emulsifying a bitumen normally non-liquid at atmospheric temperatures in an aqueous vehicle with an argillaceous emulsifying agent, the improvement which consists in stabilizing, against sedimentation, the emulsion by the addition thereto of tannic acid.

2. A bituminous composition comprising essentially finely divided particles of bitumen with heavily absorbed films of water and a colloid about the individual particles of bitumen, said water being ordinarily immiscible therewith, a substantial part of said particles being of colloidal fineness, the larger particles of said bituminous material being barely distinguishable as such by the naked eye and said composition being mobile and miscible with water in all proportions during the retention of the water in said films and forming a coherent continuous mass of bitumen not miscible with water upon removal of the water from said films.

3. A bituminous composition comprising essentially finely divided particles of bitumen with heavily absorbed films of water and a paste-forming mineral powder colloid about the individual particles of bitumen, said water being ordinarily immiscible therewith, a substantial part of said particles being of colloidal fineness, the larger particles of said bituminous material being barely distinguishable as such by the naked eye and said composition being mobile and miscible with water in all proportions during the retention of the water in said films and forming a coherent continuous mass of bitumen not miscible with water upon removal of the water from said films.

In testimony whereof I affix my signature.

LESTER KIRSCHBRAUN.